United States Patent [19]

Hirano

[11] Patent Number: 4,517,831

[45] Date of Patent: May 21, 1985

[54] TROUBLE DETECTING APPARATUS FOR A SENSOR IN AN INTERNAL COMBUSTION ENGINE SYSTEM

[75] Inventor: Yutaka Hirano, Higashimatsuyama, Japan

[73] Assignee: Diesel Kiki Co., Ltd., Japan

[21] Appl. No.: 554,606

[22] Filed: Nov. 23, 1983

[30] Foreign Application Priority Data

Nov. 25, 1982 [JP] Japan ................ 57-205558

[51] Int. Cl.³ ........................ G01M 15/00
[52] U.S. Cl. ................. 73/116; 123/198 DB
[58] Field of Search ......... 73/116, 119 A; 324/160, 324/161; 123/198 DB

[56] References Cited

U.S. PATENT DOCUMENTS 4,395,905 8/1983 Fujimori et al. ............ 73/119 A
4,404,939 9/1983 Kinzl et al. ............ 123/198 DB X Primary Examiner—Jerry W. Myracle
Attorney, Agent, or Firm—Guy W. Shoup

[57] ABSTRACT

A trouble detecting apparatus for a signal generator for generating a signal whose period changes in accordance with the speed of an internal combustion engine has a detector for detecting whether or not the period of the signal exceeds a predetermined time and a speed detector responsive to the signal for computing the engine speed. The result of the computation in the speed detector just before the period of the signal exceeds the predetermined time is compared with a reference engine speed which is set to a speed at which the engine cannot rotate stably under ordinary conditions, and it is discriminated whether or not the signal generator is defective on the basis of the result of the comparison.

10 Claims, 5 Drawing Figures

TROUBLE DETECTING APPARATUS FOR A SENSOR IN AN INTERNAL COMBUSTION ENGINE SYSTEM

BACKGROUND OF THE INVENTION

The present invention relates to a trouble detecting apparatus for a sensor in an internal combustion engine system, and more particularly, to a trouble detecting apparatus for a sensor which generates a periodical detecting signal in relation to the engine speed of the internal combustion engine.

In a system for electronically controlling an internal combustion engine, a rotational speed sensor is employed as a signal generator which produces an electrical signal indicative of the engine speed, and this sensor is arranged to generate a pulse each time the crankshaft of the engine rotates by a predetermined angle. Since the interval between successive pulses becomes short at high engine speed and long at low engine speed, the engine speed can be detected from the interval between the pulses. Therefore, when no pulses are generated on account of some trouble in the rotational speed sensor, the condition becomes the same as when the engine speed is zero. In this case, since the control circuit cannot distinguish the difference between sensor failure and zero engine speed, such a trouble has a great effect on the control of the engine operation. When the system is provided with another sensor, such as a needle valve lift sensor, which generates an electric signal by which it is possible to discriminate whether or not the engine is rotating, any trouble in the sensor can be detected rather easily. For example, such a conventional apparatus for detecting troubles in the sensor is disclosed in U.S. Pat. No. 4,395,905. However, in cases where for the sake of simplicity only a rotational speed sensor is provided, the fact that the detected period of the output signal from the rotational speed sensor becomes more than a predetermined value is taken to indicate malfunction of the sensor. Consequently, it is impossible to distinguish between the stopped condition of the engine and malfunction of the sensor.

SUMMARY OF THE INVENTION

It is, therefore, an object of the present invention to provide an improved trouble detecting apparatus for detecting trouble in a signal generator for generating an electric signal relating to the rotational speed of an internal combustion engine.

It is another object of the present invention to provide a trouble detecting apparatus which is capable of discriminating whether the lack of an output signal from a rotational speed sensor for generating an electric signal related to the engine speed of an internal combustion engine is due to the fact that the engine has stopped or to a malfunction of the rotational speed sensor, thereby making it possible to detect whether or not the rotational speed sensor is defective.

In the trouble detecting apparatus of the present invention for detecting trouble in a signal generator which generates an electric signal whose period changes in accordance with the rotational speed of an internal combustion engine, the trouble detecting apparatus comprises a computing means for computing the rotational speed N of the internal combustion engine on the basis of the period of the electric signals, a detecitng means for detecting whether or not the period T of the electric signal exceeds a predetermined time $T_O$, a comparing means for comparing the result of the computation in the computing means just before $T \geq T_O$ with a reference rotational speed $N_r$ and a means for determining whether or not a trouble exists in the signal generator from the result of the comparison in the comparing means.

The reference rotational speed $N_r$ is set to a speed at which the internal combustion engine cannot rotate stably under ordinary conditions. In other words, the reference rotational speed $N_r$ is preferably selected to be faster than the speed at engine cranking operation and slower than the speed at idling condition. For example, it is selected to be about 400 rpm. When the value of $N_r$ is set in this way, the period of the electric signals from the signal generator will, during normal operation of the generation, gradually become longer with decreasing rotational speed of the engine. Presume, for example, that the value of $T_O$ is selected as 0.75 sec. In this case, when the pulse generator is adapted to produce four pulses per one rotation of the crankshaft, the rotational speed at the time T becomes equal to 0.75 sec is certain to be well below 400 rpm in view of the inertia of the internal combustion engine. On the other hand, if T should become large because of a malfunction of the signal generator, then, since the engine was rotating at a speed at least as high as the idling speed just before the increase in the value of T, the speed N obtained by the computation carried out just before T became equal to 0.75 sec will be well above 400 rpm. In this way, any trouble in a signal generator such as a rotational speed sensor can be detected on the basis of the result of the comparison by the comparing means.

The invention will be better understood and the other objects and advantages thereof will be more apparent from the ensuing detailed description of a preferred embodiment taken in conjunction with the drawings.

DESCRIPTION OF THE PREFERRED EMBODIMENT

Figure 1:
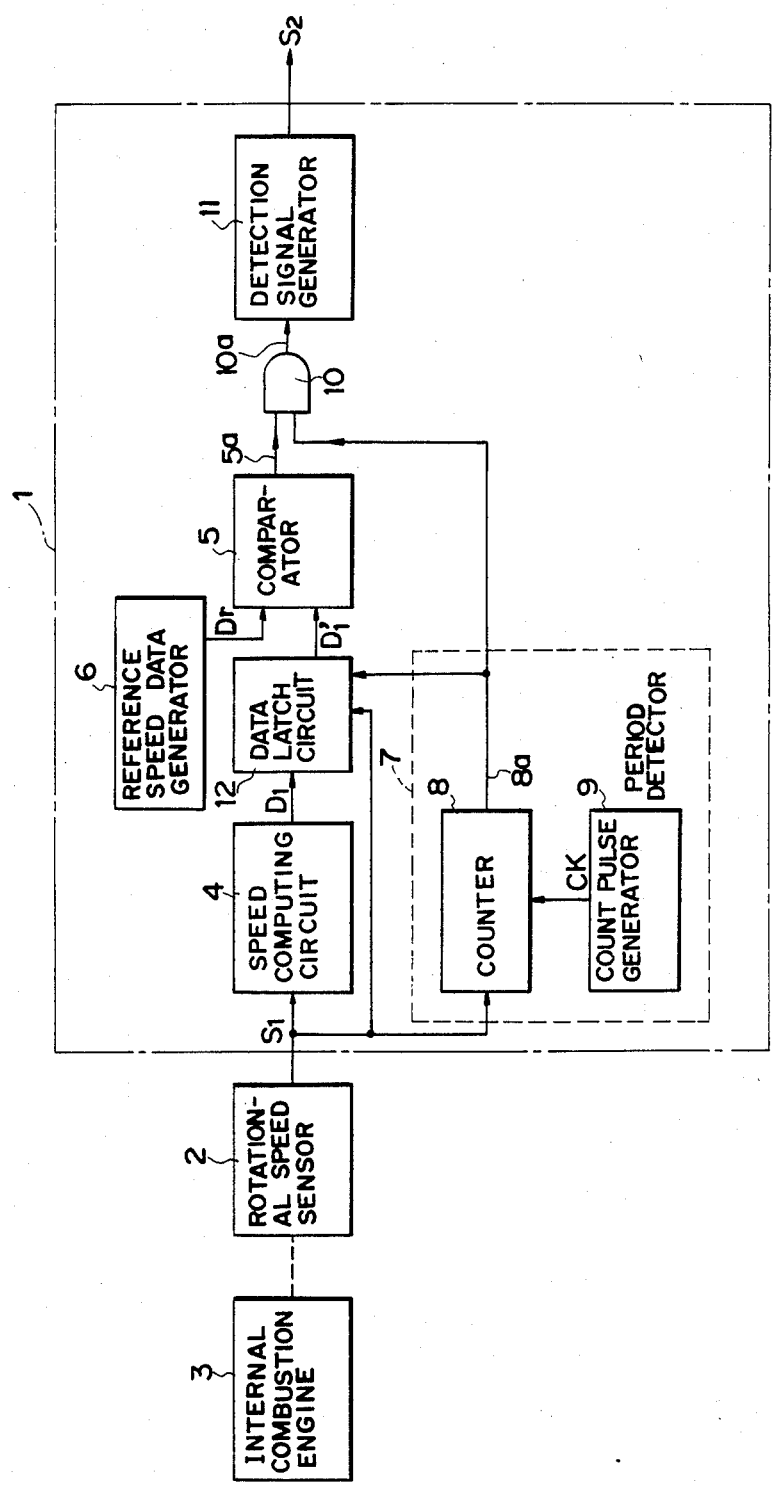
FIG. 1 is a block diagram of an embodiment of a trouble detecting apparatus according to the present invention.

FIG. 1 shows a block diagram of an embodiment of a trouble detecting device according to the present invention. The trouble detecting device 1 is a device for detecting the occurrence of a trouble or malfunction in a rotational speed sensor 2 which is connected to an internal combustion engine 3.

The rotational speed sensor 2 generates a pulse train signal composed of pulses produced one each time the internal combustion engine 3 rotates by a predetermined angle. Therefore, the period of the pulse train signal changes as the rotational speed N of the internal combustion engine 3 changes. The pulse train signal is produced form the rotational speed sensor 2 as a speed pulse signal $S_1$ which is applied to the trouble detecting device 1.

The trouble detecting device 1 has a speed computing circuit 4 which is responsive to the speed pulse signal $S_1$ and computes the rotatioanl speed N of the internal combustion engine 3 each time it receives a pulse of the speed pulse signal $S_1$. The result of the computation in the speed computing circuit 4 is output as engine speed data $D_1$, which is applied to a data latch circuit 12. The data latch circuit 12 is capable of storing two engine speed data, namely $D_{1(n)}$ showing the engine speed at the time of the occurrence of the latest pulse of the speed pulse signal $S_1$ and $D_{1(n-1)}$ showing the engine speed at the time of the occurrence of the pulse of the speed pulse signal $S_1$ just before the latest pulse. The speed pulse signal $S_1$ is also applied to the data latch circuit 12 as a latch/read-out timing pulse, and in response to the speed pulse signal $S_1$, the data latch circuit 12 operates to latch the latest data $D_{1(n)}$ and to read out the data $D_{1(n-1)}$ which was latched by the application of the pulse produced just before the latest pulse of the speed pulse signal $S_1$. The output data $D_1'$ read out from the data latch circuit 12 is applied to a comparator 5 to which a reference speed data $D_r$ is applied from a reference speed data generator 6. The engine speed data $D_1'$ is compared with the reference speed data $D_r$ representing a predetermined reference engine speed $N_r$ by the comparator 5, and the output level on the output line $5_a$ of the comparator 5 becomes high only when $N > N_r$.

That is, every time a pulse of the speed pulse signal $S_1$ is produced, the comparator 5 compares the engine speed data obtained at the time of the generation of the pulse of the speed pulse signal $S_1$ just before the pulse generated at that time with the predetermined engine speed.

In order to detect whether or not the period T of the speed pulse signal $S_1$ has become larger than a predetermined value $T_O$, the speed pulse signal $S_1$ is also applied to a period detector 7 which has a counter 8 and a count pulse generator 9 for generating a count clock pulse signal CK. The count clock pulse signal CK has a constant period, and the counter 8 is reset by the application of each pulse of the speed pulse signal $S_1$ and the count is increased by one every time the pulse of the count clock pulse signal CK is applied. The counter 8 is so arranged that one output level on the output line $8_a$ thereof becomes high only when the count of the counter 8 reaches a predetermined value K. In this embodiment, since K is selected at 50 and the period of the count clock pulse signal CK at 15 msec, it follows that the level on the output line $8_a$ becomes high when the period of the speed pulse signal $S_1$ becomes more than 0.75 sec.

Furthermore, the output line $8_a$ is also connected to the data latch circuit 12 so as to provide the signal appearing on the output line $8_a$ thereto as the latch/readout timing signal. Consequently, the data latch circuit 12 operates as mentioned above in response to not only the speed pulse signal $S_1$ but also the signal appearing on the output line $8_a$.

On the other hand, the reference engine speed Nr represented by the reference speed data $D_r$ is set to a speed at which the internal combustion engine cannot rotate stably under ordinary conditions. In other words, the reference engine speed $N_r$ is preferably selected to be faster than the speed at engine cranking operation and slower than the speed at idling condition and is, for example, about 400 rpm. When the value of $N_r$ is set in this way, the period of the speed pulse signal $S_1$ from the rotational speed sensor 2 will, during normal operation of the rotational speed sensor 2, gradually become longer with decreasing rotational speed of the internal combustion engine 3. In this case, since the value of $T_O$ is selected at 0.75 sec, the rotational speed at the time T becomes equal to 0.75 sec is well below 400 rpm in view of the inertia of the internal combustion engine. On the other hand, if the value T should become large because of a malfunction of the rotational speed sensor 2, then, since the engine was rotating at a speed at least as high as the idling speed just before the increase in the value of T, the speed N before T=0.75 sec is certain to have been well above 400 rpm.

That is, when the period of the speed pulse signal $S_1$ is 0.75 sec, the speed N is certain to be lower than $N_r$ if the rotational speed sensor 2 is operating normally and is certain to be higher than $N_r$ if any trouble has occurred in the rotational speed sensor 2.

On the basis of this fact, in order to detect malfuntion of the rotational speed sensor 2 from the result of the comparison in the comparator 5 and the result of the detection by the period detector 7, the output line $5_a$ and $8_a$ are connected to the input terminals of an AND gate 10, which outputs a high level signal when the levels on both the output lines $5_a$ and $8_a$ are high, that is, when a trouble has occurred in the rotational speed sensor 2.

The output line $10_a$ of the AND gate 10 is connected to a detection signal generator 11 which generates a detection signal $S_2$ when the level on the output line $10_a$ has once changed to high level from low level.

As described above, according to the trouble detecting device 1 shown in FIG. 1, malfunctions of the rotational speed sensor 2 can be detected on the basis of the magnitude of the engine speed N just before the period of the speed pulse signal $S_1$ becomes a predetermined value $T_O$.

Figure 2:
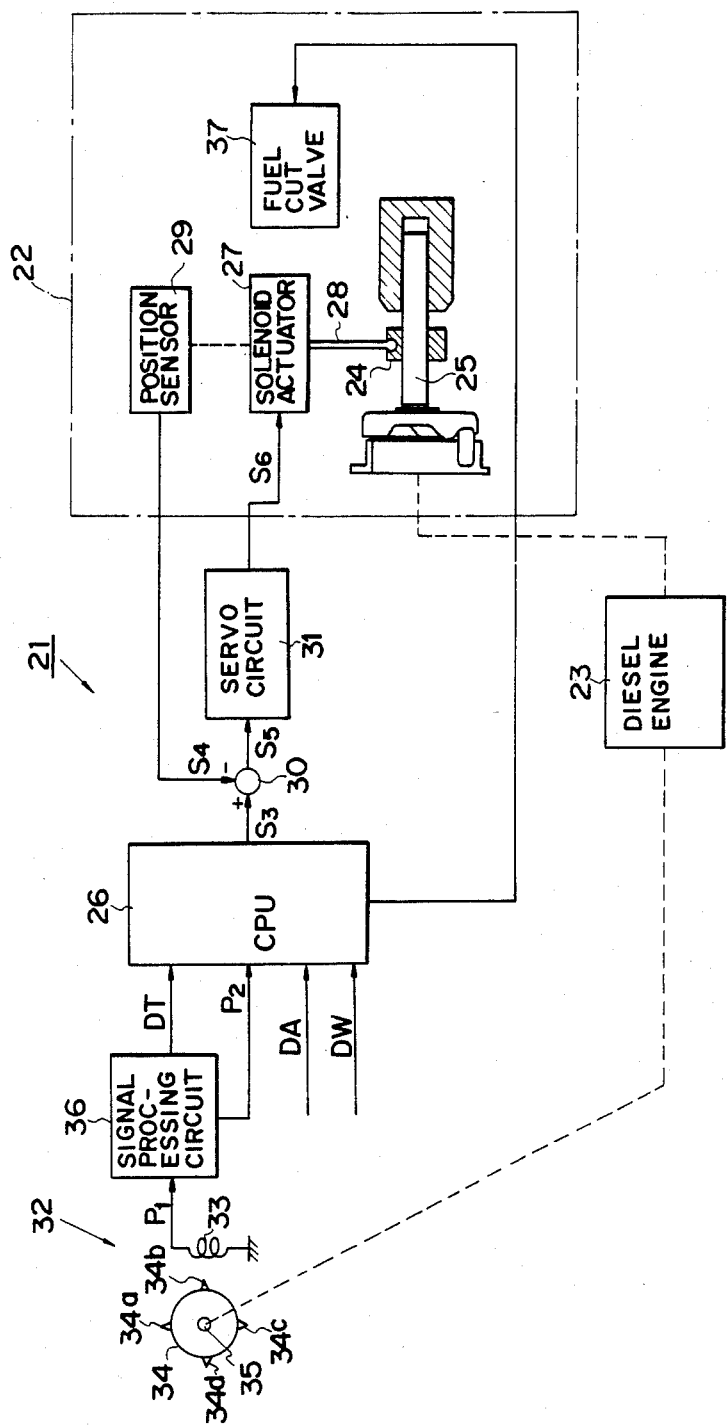
FIG. 2 is a block diagram of an embodiment of an electronically controlled type fuel injection apparatus to which the trouble detecting apparatus of the present invention has been applied.

FIG. 2 shows an embodiment of an electronically controlled type fuel injection apparatus to which the trouble detecting device for detecting malfunction of a rotational speed sensor according to the present invention has been applied. The electronically controlled type fuel injection apparatus 21 has a conventional distribution type fuel injection pump 22 for distributing and supplying fuel to each cylinder of a four-cylinder four-cycle Diesel engine 23 and the fuel injection pump 22 driven by the Diesel engine 23 is so arranged as to control the amount of fuel injected in accordance with the position of a control sleeve 24 coupled with a plunger 25.

For the purpose of positioning the control sleeve 24 at an optimum position in accordance with the operating condition of the Diesel engine 23 at each instant, a servo control system including a central processing unit (CPU) 26 is provided. To the CPU 26, three types of data are applied, namely, time data DT relating to the rotational speed of the Diesel engine 23, acceleration data DA indicating the amount of operation of the accelerator pedal (not shown) and coolant temperature data DW indicating the temperature of the engine coolant. In the CPU 26, the computation of the position of the control sleeve 24 necessary for injecting an optimum amount of fuel desirable for the operating condition of the engine at each instant is carried out in accordance with these input data DT, DA and DW and the signal indicating the result of the computation is output from the CPU 26 as a target sleeve position signal $S_3$.

The position of the control sleeve 24 is controlled by a solenoid actuator 27 connected therewith through a connecting rod 28 and an actual position signal $S_4$ indicating the actual position of the control sleeve 24 at each instant is produced from a position sensor 29 connected to the solenoid actuator 27. The target sleeve position signal S₃ and the actual position signal S₄ are added by means of an adder 30 with the polarities shown in the figure, and an error signal S₅ obtained as a result of such adding operation in the adder 30 is applied to a servo circuit 31. Then, a control signal S₆ for controlling the position of the control sleeve 24 generated from the servo circuit 31 in response to the error signal S₅ and the control signal S₆ is applied to the solenoid actuator 27. As a result, the position of the contorl sleeve 24 is controlled to be positioned to the position indicated by the target sleeve position signal S₃.

Reference numeral 32 designates a well-known rotational speed sensor which has an electromagnetic pick-up coil 33 and a rotating body 34 which is fixed to a crankshaft 35 of the engine and has four cogs 34a to 34d equiangularly spaced about its circumference. Every time one of the cogs approaches and goes away from the electromagnetic pick-up coil 33, electric pulse signals P₁ are produced from the electromagnetic pick-up coil 33. The electric pulse signals P₁ are applied to a signal processing circuit 36 to effect waveform shaping to the electric pulse signals P₁ and produce a timing pulse train P₂. Therefore, the timing pulse train P₂ is composed of pulses generated one for every 90 degrees of rotation of the crankshaft 35.

Furthermore, the signal processing circuit 36 is programmed to compute the period of the timing pulse train P₂ or the electric pulse signals P₁ and the result of the computation of the period of the timing pulse train P₂ made on the basis of the intervals between the pulses of the timing pulse train P₂ is supplied to the CPU 26 as time data DT. The timing pulse train P₂ is also applied to the CPU 26 as an interrupt signal, and the time data DT is read into the CPU 26 at each input of a pulse of the timing pulse train P₂.

Figure 3:
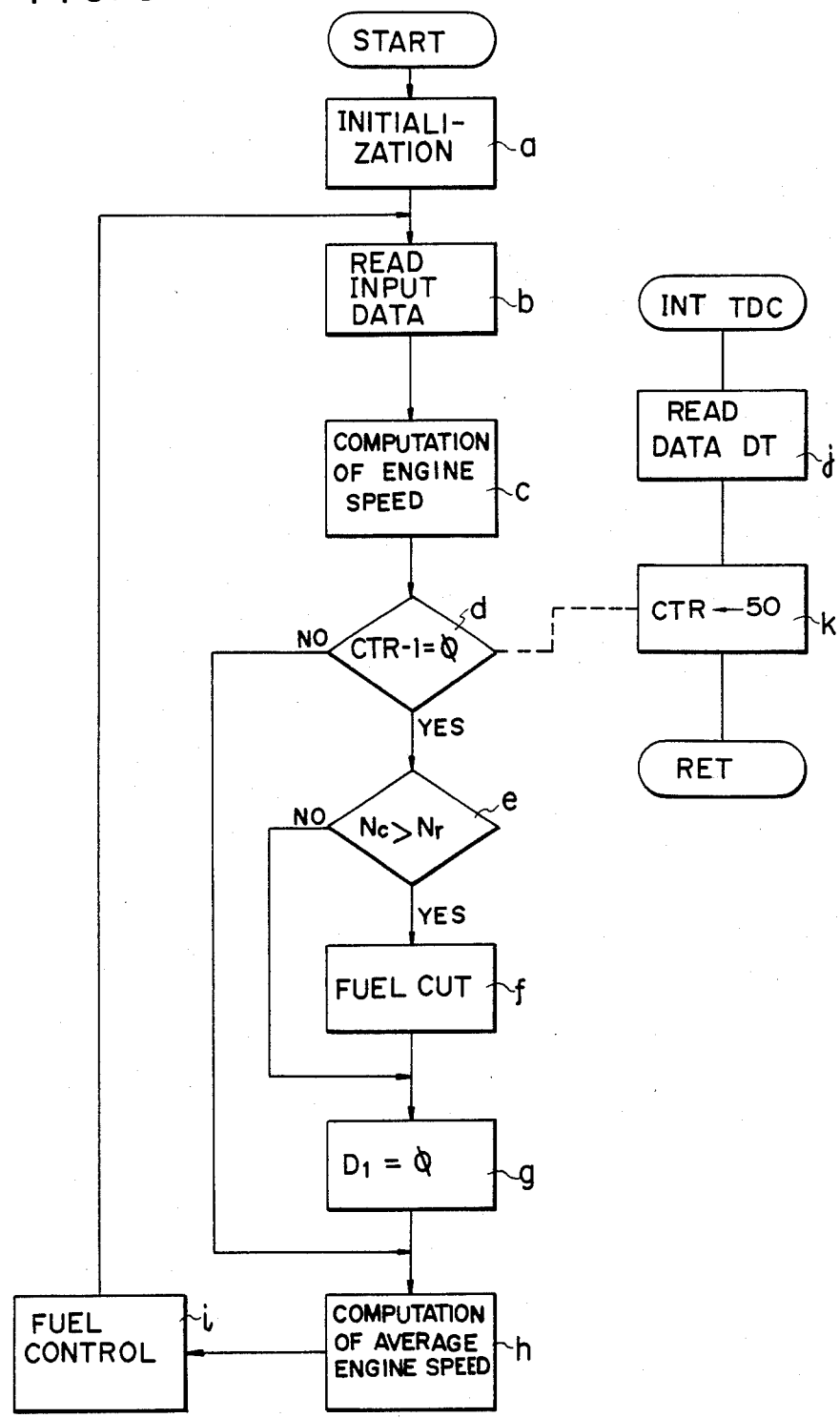
FIG. 3 is a flow chart of a control program stored in the CPU of FIG. 2.

FIG. 3 is the flow chart of a control program stored in the CPU 26. The control program has a trouble detecting program for detecting stoppage of the pulses due to a malfunction of the rotational speed sensor 32.

When execution of the control program is started, initialization is first carried out (step a), and then, all the data applied to the CPU 26 except the time data DT are read into the CPU 26 (step b). The time data DT, as described in detail later, is read into and stored in the CPU 26 every time an interruption program INT TDC is carried out in response to the input of a pulse of the timing pulse train P₂.

In step c, the rotational speed N at each instant is computed on the basis of the time data DT. Since the time data DT shows the period T of the timing pulse train P₂ or electric pulse signals P₁, the relationship between the rotational speed N of the Diesel engine 23 and the time data DT, can be expressed as:

$$N = C/DT \text{ (C: constant)}$$

Therefore, the rotational speed N of the engine can be easily computed on the basis of the time data DT.

Referring to the interruption program INT TDC, which is executed in response to the occurrence of a pulse of the timing pulse train P₂, the time data DT is read in step j and the content CTR of the monitoring counter provided in the CPU 26 is set at 50 (step k). Then the execution of the interruption program INT TDC is completed and the procedure goes back to the main program.

The content CTR of the monitoring counter which is set, as described above, in the interruption program is substracted by 1 in step d and the discrimination as to whether the content CTR of the monitoring counter after the substraction is zero or not is carried out. If the result of the discrimination is NO, the average engine speed is computed on the basis of the result of the computation of engine speed N in step c and the results concerning engine speeds obtained several cycles before (step h), and in step i, on the basis of this average value and other input data DA and DW, the computation for the control of the amount of fuel to be injected, which includes the computation of the target position of the control sleeve 24, is executed.

When the rotational speed sensor 32 is operating normally and the rotational speed of the Diesel engine 23 is high enough for stable engine operation (that is, faster than the idling speed), even if the idling speed is presumed to be 600 rpm, the pulses of the timing pulse train P₂ are generated at least every 25 ms. Therefore, since the content CTR of the monitoring counter is set at 50 at least every 25 ms, the discriminating result in step e should be NO, if the time required for executing one cycle of the main program is 0.5 ms or more.

In the above embodiment, although the set value for the monitoring counter is selected at 50, it can be set at any appropriate number, depending on the idling speed and the one-cycle executing time for the main program, which should not reach zero by reducing 1 by 1 per one execution of the main program. The embodiment shown in the figure is arranged such that the content CTR of the monitoring counter reaches zero when no pulse of the timing pulse train P₂ is generated for longer than 0.75 seconds.

Next an explanation will be made on the program steps for discriminating between the decrease in rotational speed of the engine and trouble in the rotational speed sensor, when the period of pulse generation of the timing pulse train P₂ happens to be longer than 0.75 second and the discriminating result in step d becomes YES.

When the result of discrimination in step d is YES, the latest rotational speed $N_i$ computed in step c is compared with a predetermined value $N_r$ of the rotational speed in step e. The value $N_r$ of the rotational speed is selected within the range of rotational speeds at which the engine does not rotate stably under usual conditions, and is, for example, set to be faster than the speed during cranking operation and slower than idling speed. In the present embodiment, it is selected at 400 rpm. In the case that the value of the rotational speed $N_r$ is selected as described above, when the content of the monitoring counter becomes zero due to some trouble in the rotational speed sensor 32, the engine speed at that time will be at least higher than the idling speed. Consequently, the value of the latest rotational speed N indicated by the engine speed data $D_1$ at that time should be larger than $N_r$. On the other hand, when the content of the monitoring counter becomes zero due to a decrease in engine speed, since the inertia of the engine assures that the speed will not decrease rapidly but only gradually, the value of the engine speed N at that time will be well below the speed at idling operation, to such an extent that stable rotation cannot be secured under usual conditions. Consequently, on comparing the value N with the value $N_r$, $N \leq N_r$.

Figure 4A:
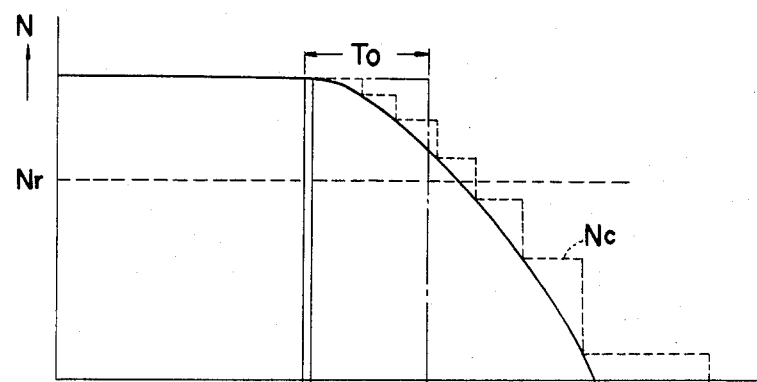
FIGS. 4A and 4B are views illustrating the trouble detecting operation in the apparatus shown in FIG. 2.
Figure 4B:
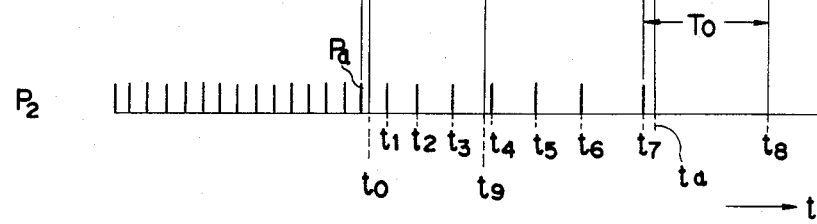

A further detailed explanation will now be made in conjunction with FIGS. 4A and 4B. In FIG. 4A the change in the actual engine speed N when the Diesel engine 23 is stopped by turning off the ignition switch is shown by a solid line with time t on the X-axis and the rotational speed N on the Y-axis. As will be understood from FIG. 4A, when the ignition switch is turned off at time $t_O$, the engine speed $N_i$ decreases gradually in accordance with a predetermined curve and becomes zero at time $t_a$. As the engine speed N decreases in this way, the interval between successive pulses of the timing pulse train $P_2$ becomes longer and longer as shown in FIG. 4B. The time data DT is read into the CPU 26 at times $t_1, t_2, \ldots t_7$ and each time data DT is stored at least until the application of the subsequent pulse. Since the computation of the rotational speed N is carried out on the basis of the time data DT stored during each program cycle, the value $N_c$ of the computed engine speed obtained in the CPU 26 depends on the time data read in at times $t_1, t_2, \ldots t_7$. Therefore, the value $N_c$ changes as shown by the broken line in FIG. 4A. In FIG. 4A, for simplifying the description, the computation of engine speed is shown to be carried out at the same times $t_1, t_2, \ldots t_7$ that the time data DT is read in. As a result, in FIG. 4A, the value $N_c$ of the computed engine speed is shown to change at times $t_1, t_2, \ldots t_7$.

When the rotational speed N becomes zero after the correction of the time data at time $t_7$, and no pulses of the timing pulse train $P_2$ are produced after this, as described above, the engine speed value $N_c$ obtained by the computation is made zero at time $t_8$, that is, after the passage of a predetermined time $T_O$ from time $t_7$, by the operation of the monitoring counter (step g).

If a trouble should occur in the rotational speed sensor 32 at time $t = t_O$ and no pulse of the timing pulse train $P_2$ is generated after this, the engine speed computed on the basis of the time data DT which was obtained at the generation of the pulse $P_a$ produced just before the time $t_0$ (see FIG. 4B) is used until a predetermined time $T_O$ has passed from the time of the generation of the pulse $P_a$. Then, at time $t = t_9$ when the predetermined time $T_O$ has lapsed the value of the computed engine speed $N_c$ is made zero. This is shown by a chain line in FIG. 4A.

Therefore, if the pattern of speed decrease of the Diesel engine when the ignition switch is switched off is taken into consideration in determining the value of $N_r$, it is possible to discriminate whether or not any trouble exists in the rotational speed sensor 32 by the discriminating process in step e.

As described above, the result of the discrimination in step e will be $N_c > C_r$ when any trouble exists in the rotational speed sensor 32, and $N_c \leq N_r$, when the engine speed is decreased, whereby it becomes possible to detect the occurrence of any trouble in the rotational speed sensor 32.

That is, it is possible to detect the occurrence of any trouble in the rotational speed sensor 32 from the fact that no pulse of the timing pulse train $P_2$ is generated for longer than a predetermined time, which fact is detected by the setting and substracting operation of the monitoring counter, and from the comparison of the computed value $N_c$ of the engine speed with the predetermined value $N_r$.

If $N_c > N_r$, a back-up process for stopping the fuel supply by closing a fuel cut valve 37 is executed in step f and the program proceeds to step g. From the viewpoint of safety, this back-up process should preferably be designed so that once a malfunction of the rotational speed sensor has been detected, the fuel cut valve will not open again even if the generation of the pulses of the timing pulse train $P_2$ should resume.

The step g is for setting the engine speed data $D_1$ in the CPU 26 to zero in response to the cease of the generation of the electric pulse signals $P_1$ from the rotational speed sensor 32, and the content of the memory for storing the computed engine speed data $D_1$ is rewritten to a zero speed data. This rewriting operation is made for following reason. Since application of the time data DT to the CPU 26 is stopped when the generation of the electric pulse signals $P_1$ stops, the former data concerning the engine speed is kept in the memory if the data rewriting operation is not made. To eliminate this problem, the data is rewritten in such a way that the content of the memory corresponds to the output condition of the rotational speed sensor 32. When the discrimination result in step c is NO, the procedure advances directly to step g where engine speed data in the memory is rewritten to zero speed for the same reason.

According to the present invention, as mentioned above, the stoppage of generation of pulses by the rotational speed sensor due to trouble in the sensor is accurately discriminated from that caused by stoppage of the rotation itself.

I claim:

1. A trouble detecting apparatus for detecting trouble in a signal generator which generates an electric signal whose period changes in accordance with the rotational speed of an internal combustion engine, comprising:
   a computing means responsive to said electric signal for computing the rotational speed of the internal combustion engine;
   a detecting means for detecting whether or not the period of said electric signal exceeds a predetermined time;
   a comparing means for comparing the result of the computation in said computing means just before the period of said electric signal exceeded said predetermined time with a reference rotational speed in response to the results from said detecting means and said computing means; and
   means responsive to the result of the comparison in said comparing means for discriminating whether or not said signal generator is defective.

2. An apparatus as claimed in claim 1 wherein said signal generator is a rotational speed sensor for generating a rotational speed signal whose period changes in response to the rotational speed of the internal combustion engine.

3. An apparatus as claimed in claim 1 wherein the rotational speed of the internal combustion engine is computed in said computing means on the basis of the period of said electric signal.

4. An apparatus as claimed in claim 1 wherein said signal generator is a sensor for generating a pulse train signal which is formed by pulses produced at intervals related to the rotational speed of the internal combustion engine.

5. An apparatus as claimed in claim 4 wherein said detecting means has a pulse generator for generating count pulses with a constant period and a counter which counts the count pulses and is reset in response to the generation of a pulse by said signal generator and a detecting signal is produced from said counter when the count of said counter reaches a predetermined number.

6. An apparatus as claimed in claim 5 wherein the product of the predetermined number and the period of said count pulse is selected to be greater than the period of said pulse train signal at said reference rotational speed.

7. An apparatus as claimed in claim 1 wherein said reference rotational speed is set to a speed at which the internal combustion engine cannot rotate stably under ordinary conditions.

8. An apparatus as claimed in claim 1 wherein said reference rotational speed is selected to be between the idling speed and the rotational speed during the cranking operation.

9. An apparatus as claimed in claim 1 wherein said discriminating means produces a signal indicative of the occurrence of trouble in said signal generator when the period of said electric signal exceeds said predetermined time and the rotational speed of the internal combustion engine computed in said computing means just before the period of said electric signal exceeded said predetermined time is less than said reference rotational speed.

10. An apparatus as claimed in claim 9 wherein the fuel supplied to the internal combustion engine is cut off in response to said signal from said discriminating means.

* * * * *